(12) United States Patent
Manders et al.

(10) Patent No.: US 7,753,438 B2
(45) Date of Patent: Jul. 13, 2010

(54) OPEN ROOF CONSTRUCTION FOR A VEHICLE

(75) Inventors: Peter Christiaan Leonardus Johannes Manders, Horst (NL); Eduardus Christianus Henricus van Boxtel, Zeeland (NL); Marcel Johan Christiaan Nellen, Venray (NL); Robertus Wilhelmus Henricus Luijpers, Venray (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 12/172,500

(22) Filed: Jul. 14, 2008

(65) Prior Publication Data

US 2009/0021056 A1 Jan. 22, 2009

(30) Foreign Application Priority Data

Jul. 16, 2007 (EP) .................................. 07112527

(51) Int. Cl.
*B60J 7/05* (2006.01)
*B60J 7/057* (2006.01)

(52) U.S. Cl. ........................ 296/221; 296/223; 296/224

(58) Field of Classification Search ................. 296/221, 296/223, 224
See application file for complete search history.

(56) References Cited

U.S. PATENT DOCUMENTS

| | | | |
|---|---|---|---|
| 4,826,239 A | 5/1989 | Nishikawa | |
| 5,727,840 A | 3/1998 | Ochiai | |
| 6,893,084 B2 | 5/2005 | Tamura | |
| 7,104,598 B2 * | 9/2006 | Wingen | 296/216.03 |
| 2005/0017547 A1 | 1/2005 | Wingen | |

FOREIGN PATENT DOCUMENTS

| | | |
|---|---|---|
| DE | 10158174 | 6/2003 |
| EP | 1500539 | 1/2005 |
| EP | 1674314 | 6/2006 |

OTHER PUBLICATIONS

Official Search Report of the European Patent Office in counterpart foreign application No. EP 07112527.2 filed Jul. 16, 2007.

* cited by examiner

*Primary Examiner*—Dennis H Pedder
(74) *Attorney, Agent, or Firm*—Steven M. Koehler; Westman, Champlin & Kelly, P.A.

(57) ABSTRACT

An open roof construction for a vehicle having a roof opening defined in a stationary roof part includes a roof assembly having a movable panel for opening and closing said roof opening, with a slide which is movable along a stationary slide guide and which is provided with panel engagement device cooperating with a panel curve of the movable panel, wherein a movement of the slide is capable of generating a tilting and/or sliding movement of the panel. The roof assembly further includes a locking lever which by means of a hinge point is connected to the panel and which is provided with slide engagement device cooperating with a slide curve of the slide. A guide member cooperating with a stationary lever guide and a locking member cooperating with a stationary locking guide, such that in a first position of the slide the locking member is housed in a first stationary locking guide part preventing a translational movement of the locking lever and panel connected therewith and in a second position of the slide the locking member is housed in a second stationary locking guide part allowing a translational movement of the locking lever, and thus of the panel connected therewith at the hinge point.

20 Claims, 8 Drawing Sheets

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle having a roof opening defined in a stationary roof part. A roof assembly for the roof opening includes a movable panel for opening and closing said roof opening, with a slide which is movable along a stationary slide guide and which is provided with a panel engagement device cooperating with a panel curve of the movable panel, wherein a movement of the slide is capable of generating a tilting and/or sliding movement of the panel.

In such an open roof construction, the movement of the slide basically is responsible for the movements of the movable panel (i.e. tilting and/or sliding movements of the panel). For discriminating between a tilting movement and a sliding movement of the panel, in the state of the art complicated mechanisms are used.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

In accordance with one aspect of the present invention there is provided an open roof construction or roof assembly of the type referred to above, which includes a locking lever which by means of a hinge point is connected to the panel and which is provided with slide engagement device cooperating with a slide curve of the slide, a guide cooperating with a stationary lever guide and a locking member cooperating with a stationary locking guide, such that in a first position of the slide the locking member is housed in a first stationary locking guide part preventing a translational movement of the locking lever and panel connected therewith, and in a second position of the slide the locking member is housed in a second stationary locking guide part allowing a translational movement of the locking lever, and thus of the panel connected therewith at the hinge point.

The open roof construction or roof assembly described above allows obtaining the desired movements of the movable panel with a minimum of parts. The position of the locking lever basically defines two situations.

Firstly a situation (locking member positioned in the first stationary locking guide part) in which a translational movement of the locking lever (and thus of the panel connected therewith at the hinge point) is prevented, but in which the moveable panel can be tilted to a tilt position, and secondly a situation (locking member positioned in the second stationery locking guide part) in which such a translational movement (possibly in combination with a tilting movement of the movable panel) is allowed. The movement of the locking lever is generated automatically by the sliding movement of the slide, and no complicated additional mechanisms are necessary.

The present open roof construction or roof assembly provides a total design freedom of the movement of the panel and specifically the leading edge thereof. As a result shocks and clicks as a result of excessive or uncontrolled accelerations can be avoided, leading to smoother movements of the construction parts.

BRIEF DESCRIPTION OF THE DRAWINGS

Hereinafter the invention will be elucidated while referring to the drawing, in which.

DETAILED DESCRIPTION OF THE ILLUSTRATIVE EMBODIMENT

Referring to FIGS. 3-7, an open roof construction for a vehicle having a roof opening 1 defined in a stationary roof part 2 includes a roof assembly comprising a movable panel 3 for opening and closing said roof opening 1.

Figure 1:
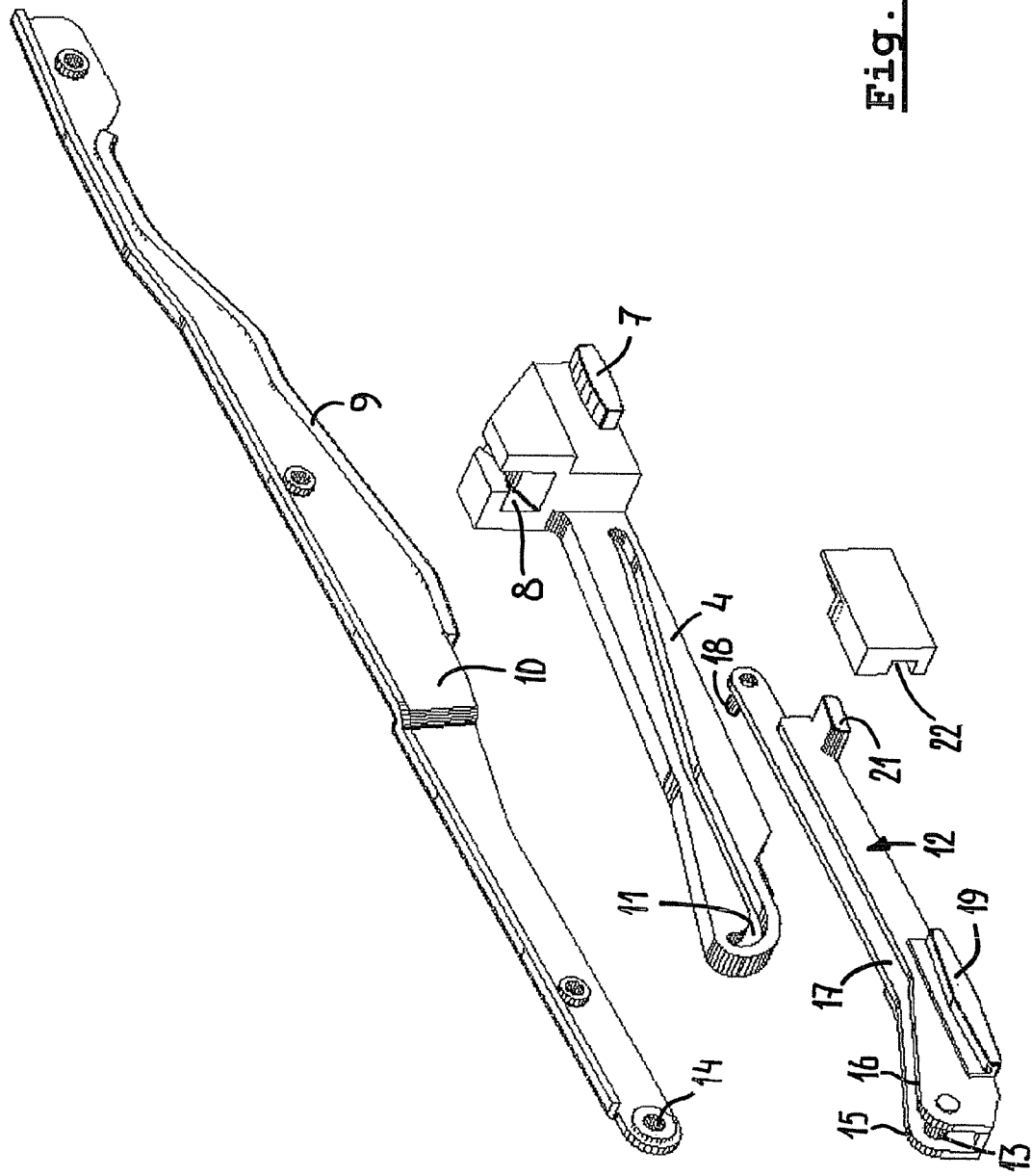
FIG. 1 shows, in an isometric exploded view parts of an embodiment of the open roof construction.
Figure 3:
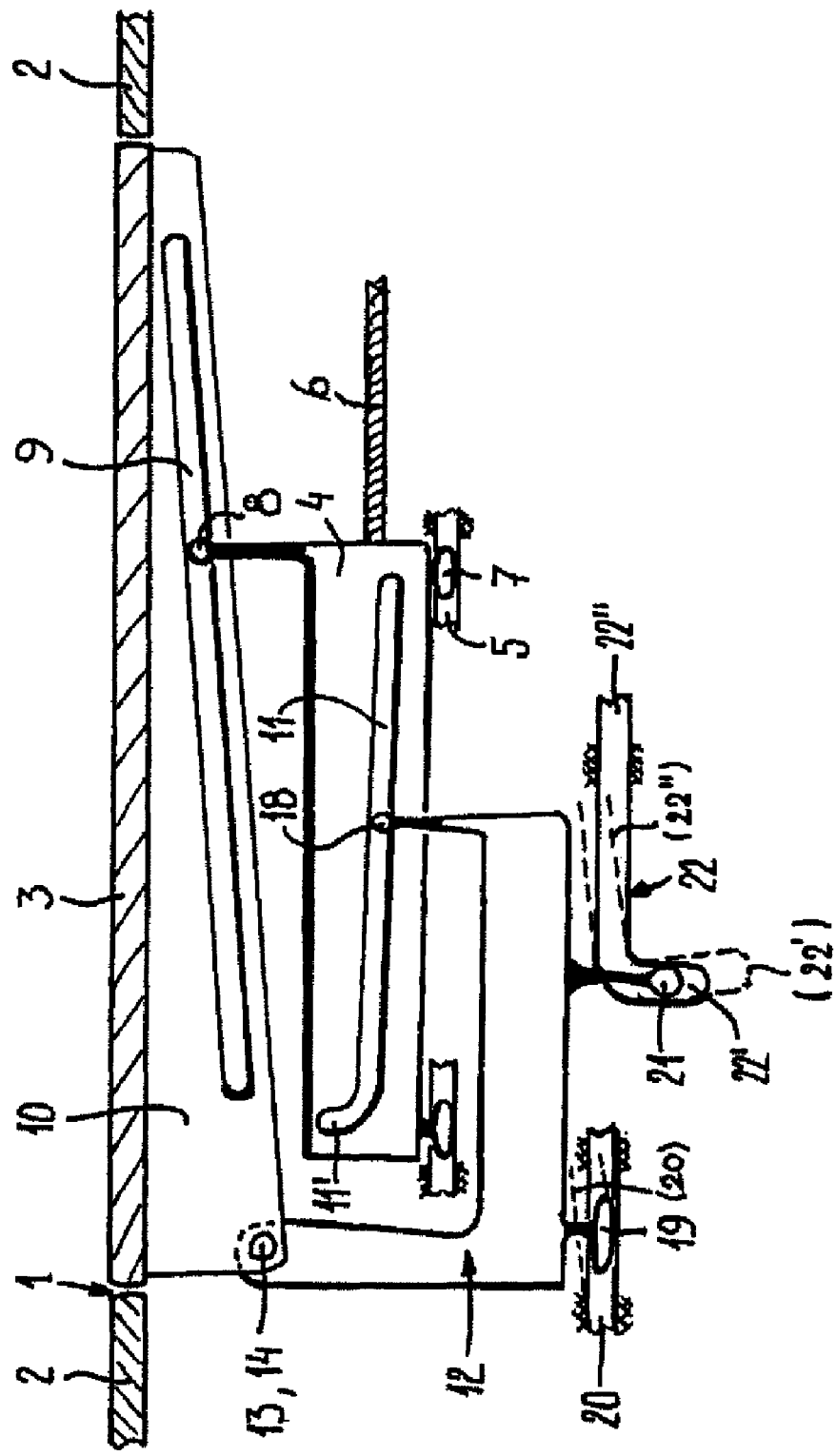
FIG. 3 is a schematical side elevational representation of an open roof construction.

Referring to FIG. 1, a slide 4 is illustrated which is movable along a stationary slide guide 5 (see FIG. 3).

As illustrated, for example, in FIG. 3, the movement of the slide 4 may be obtained by drive 6, for example a drive cable known per se. The slide 4 may be provided with guide shoes 7 cooperating with the stationary slide guide 5.

The slide 4 includes a panel engagement device 8 for cooperation with a panel curve 9 of the movable panel 3. In the embodiment illustrated in FIG. 1 said panel engagement device 8 comprises a T-shaped recess, whereas the panel curve 9 is defined by a correspondingly shaped longitudinal T-shaped member being part of a bracket 10 which, in a manner not illustrated in detail, is connected to the movable panel 3.

The slide 4 further comprises a slide curve 11 which, in the embodiment illustrated here, has an inclined extension, as will be elucidated below.

The roof assembly further comprises a locking lever 12 which by means of a hinge pin 13 can be connected to a corresponding hinge point 14 on the panel 3 such as via the bracket 10 herein illustrated.

In the embodiment illustrated in FIG. 1, the locking lever 12 is constructed as a member having a U-shaped cross section with two distanced or spaced apart webs 15 and 16 defining therebetween a gap 17 for at least partially receiving a part of the (bracket 10 of the) panel 3.

The locking lever 12 further is provided with a slide engagement device 18, in the illustrated embodiment a pin, which will cooperate with the slide curve 11 of the slide 4. Further the locking lever 12 comprises a guide member 19 cooperating with a stationary lever guide 20 (illustrated in a horizontal position (full lines) or in a position extending inclined relative to the horizontal (broken lines) in FIG. 3) and a locking member 21 cooperating with a stationary locking guide 22.

Figure 2:
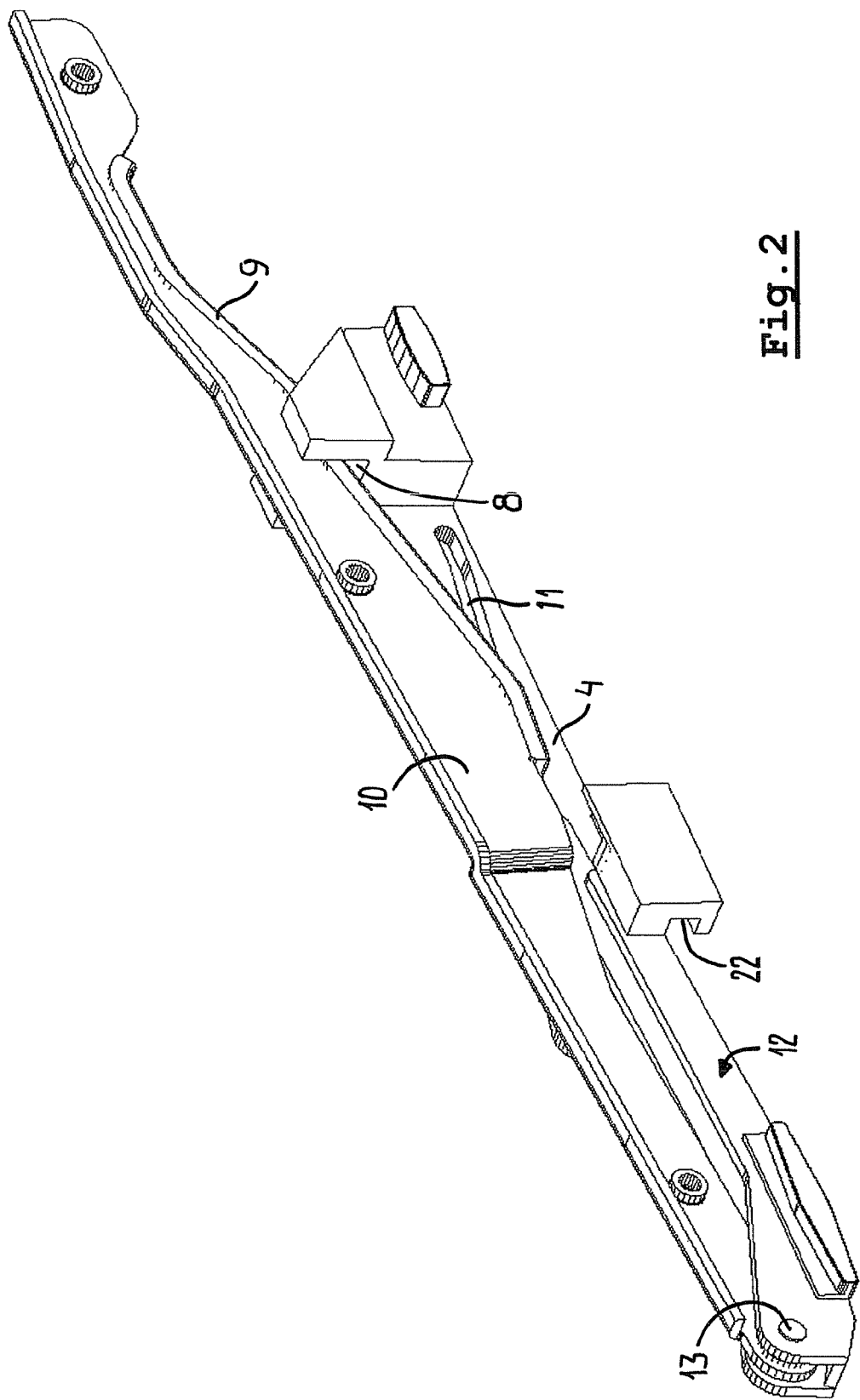
FIG. 2 illustrates the embodiment of FIG. 1 in an assembled position.

FIG. 2 shows the parts represented in FIG. 1 in an assembled position, in which a connection between the locking lever 12 and bracket 10 (and thus panel 3) is defined by the hinge pin 13 (and hinge point 14, not visible here), and wherein the T-shaped recess 8 receives the T-shaped member 9. Further, in this position the pin 18 (not visible here) is received in the slide curve 11 and the locking member 21 (neither visible here) is received in the stationary locking guide 22.

FIG. 3 shows schematically the relative positions and cooperation between the respective parts of the roof assembly in accordance with the present invention. It is noted, that FIG. 3 shows a possible embodiment in full lines, and other embodiments in broken lines.

FIG. 3 shows in full lines a situation, in which the panel 3 closes the roof opening 1 and in which the locking member 21 of the locking lever 12 is positioned in a first part 22' of the stationary locking guide 22. This first stationary locking guide part 22' extends substantially vertically and connects to a second stationary locking guide part 22" extending substantially horizontally (or, more correctly, in parallel to the direction of movement of the slide 4). The first guide part 22' also may extend inclined relative to the vertical, whereas the second guide part 22" may extend inclined relative to the horizontal, as shown in broken lines in FIG. 3.

When, starting in the position illustrated in FIG. 3, the slide 4 is moved to the left, the slide engagement device 18 of the locking lever 12 will slide in the slide curve 11 because the locking lever 12 cannot move to the left (this is prevented by the position of the locking member 21 in the vertically extending first stationary locking guide part 22'); as a consequence, the panel 3 (which is connected to the locking lever 12 at the hinge point 14) neither will follow the movement of the slide 4.

During the movement of the slide 4 to the left its panel engagement means 8 moves along the panel curve 9 which extends inclined downwardly (to the left), such that the panel 3 will rotate around hinge point 14 to an upwardly tilted position.

It is noted, that the slide curve 11 may be provided with such an inclination that the locking lever 12, during such a movement of the slide 4, will slightly rotate around the guide member 19 such that the hinge pin 13/hinge point 14, and thus, the panel 3 obtains a corresponding movement, which may be necessary to obtain or maintain an appropriate position at the leading edge of the panel 3 where it engages the stationary roof part 2. In addition a longitudinal displacement of the panel 3 can be generated by moving the vertically extending first stationary locking guide part 22' out of the vertical and/or moving the locking guide part 22" out of the horizontal orientation.

Again referring to FIG. 3, when the slide 4 (as driven by drive cable 6) is moved to the right, firstly panel engagement device 8 moves along the panel curve 9, and thus, the panel 3 will rotate around hinge point 14 to a downwardly tilted position. Meanwhile the slide engagement device 18 of the locking lever 12 is moved to the left relative to and in the slide curve 11 of the slide 4, and eventually will reach an upwardly extending part 11' thereof. As a result, the slide engagement device 18 and lever 12 will move upwardly and the locking member 21 will move upwardly out of the vertically extending stationary locking guide part 22'. The locking member 21 then will enter the horizontally extending stationary locking guide part 22", such that the locking lever 12 now may move along with the slide 4 to the right. As a consequence, the panel 3 also will move to the right.

The above means, that, during the movement of the slide 4 to the right, the panel 3 firstly is moved to a downwardly tilted position and then is slid to the right underneath the adjacent stationary roof part 2.

For again closing the panel 3, a reverse movement of the slide 4 to the left will lead to a reversed order of movements of the respective parts of the open roof construction.

In the illustrated embodiments, the guide member 19, as seen in lengthwise direction of the locking lever 12, is positioned between the hinge pin 13 (hinge point 14) and the slide engagement device 18. However, it is possible too that the hinge pin 13 (hinge point 14) is positioned between the guide member 19 and the slide engagement device 18, or that the hinge pin 13 (hinge point 14), as seen in lengthwise direction of the locking lever 12, coincides with the guide member 19 of the locking lever 12. Such different embodiments will lead to different movements of the hinge point 14 (and, thus, the leading edge of the panel 3) in an upward or downward direction when the locking lever 12 is rotated around the guide member 19 as a result of the slide engagement device 18 thereof moving in an inclined (part of the) slide curve 11 of the slide 4. Thus one can choose the most appropriate movement of the leading edge of the panel 3, depending on the respective circumstances.

Figure 9:
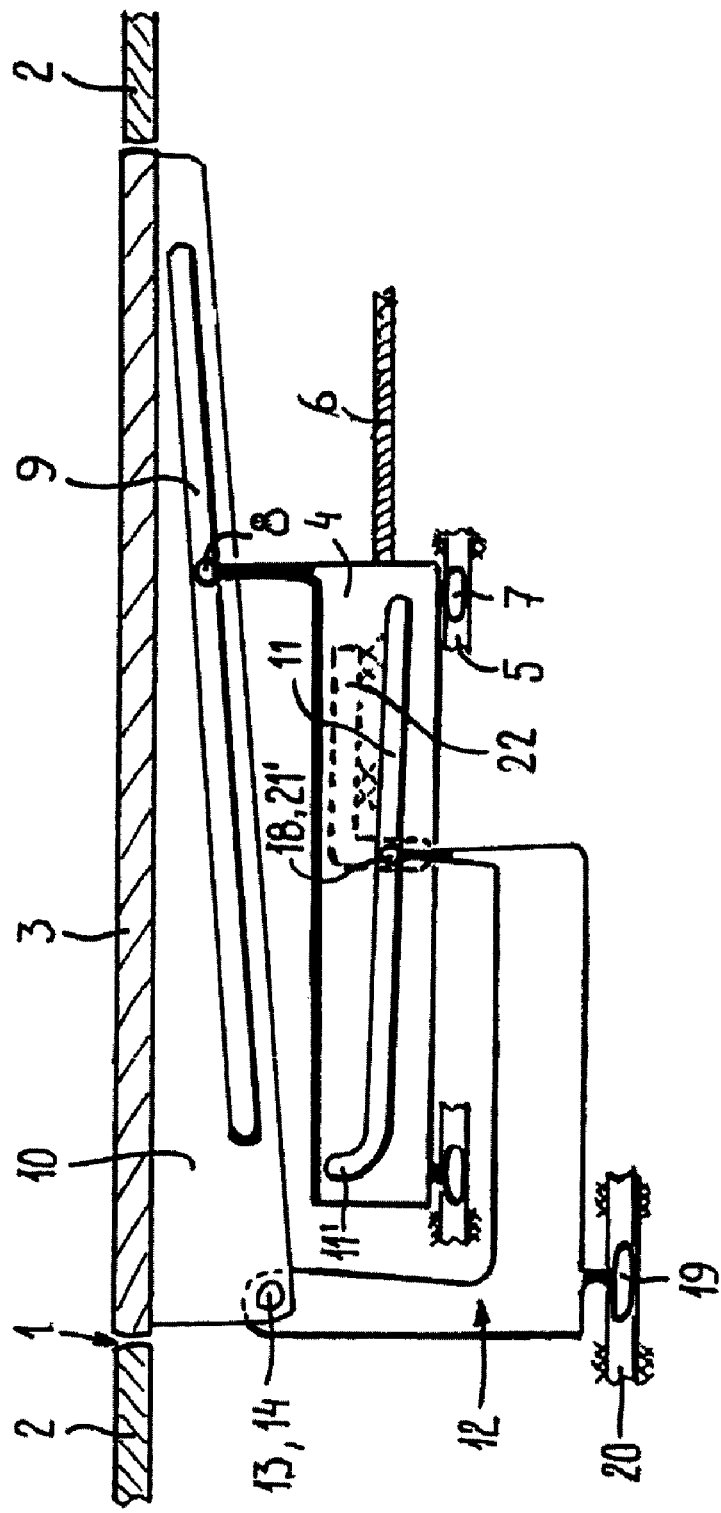

The position of the locking member 21 also may be changed; instead of being a separate member as illustrated here, such a locking member 21 for example also could coincide with the slide engagement device 18 (as indicated by (21') in FIG. 9).

Figure 10:
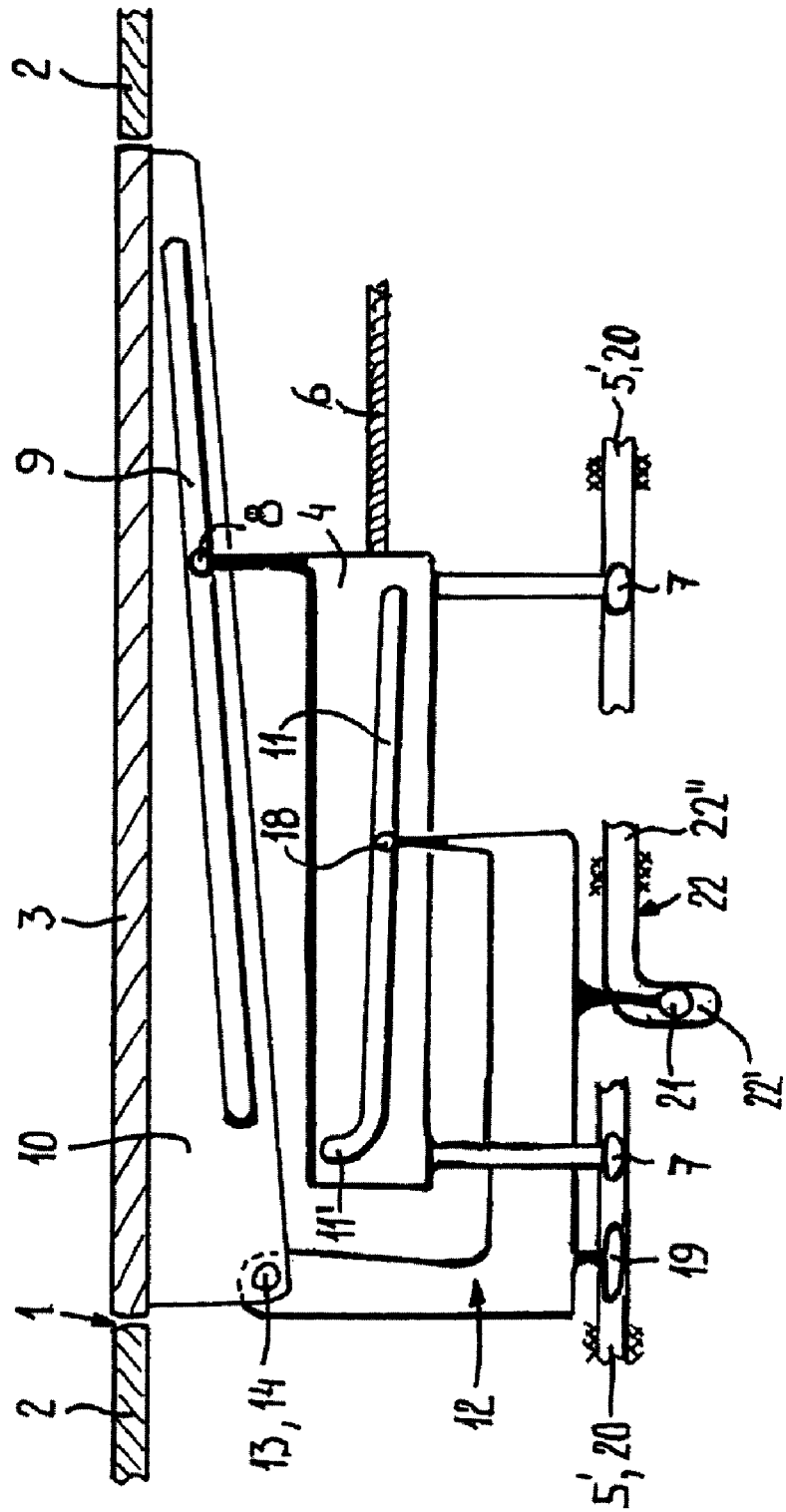

Further it is noted, that, whereas in FIG. 3 the stationary slide guide 5 and stationary lever guide 20 are illustrated as distinct members, such guides also could be combined into one single guide (as indicated by (5') in FIG. 10).

The position of the locking member 21 also may be changed; instead of being a separate member as illustrated here, such a locking member 21 for example also could coincide with the hinge pin 13 or with the slide engagement device 18.

Further it is noted, that, whereas in FIG. 3 the stationary slide guide 5 and stationary lever guide 20 are illustrated as distinct members, such guides also could be combined into one single guide.

Figure 4:
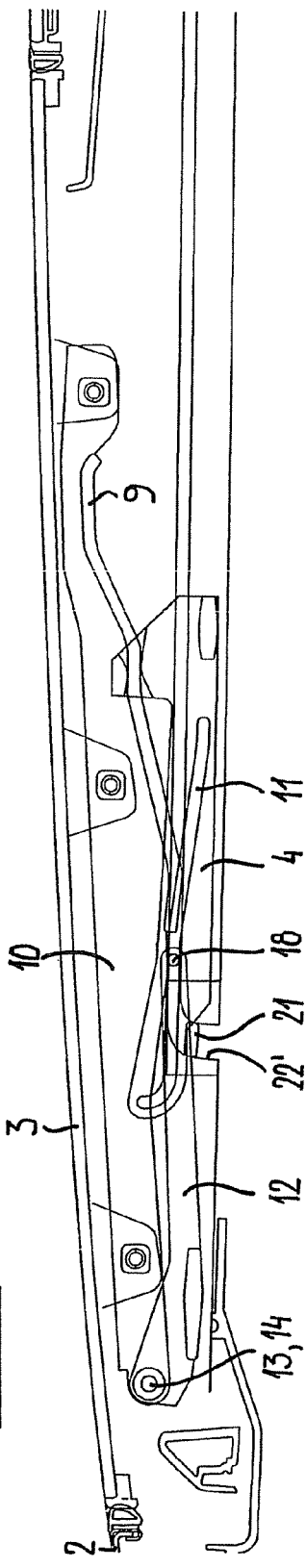
FIGS. 4-7 illustrate in a side elevational view the cooperation of parts of an open roof construction in four different positions.
Figure 5:
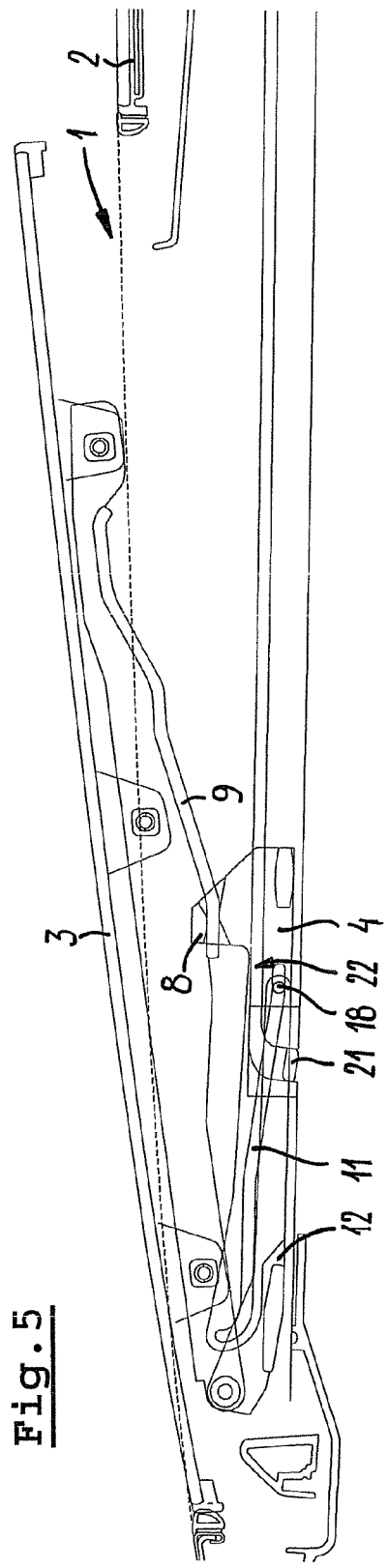
Figure 6:
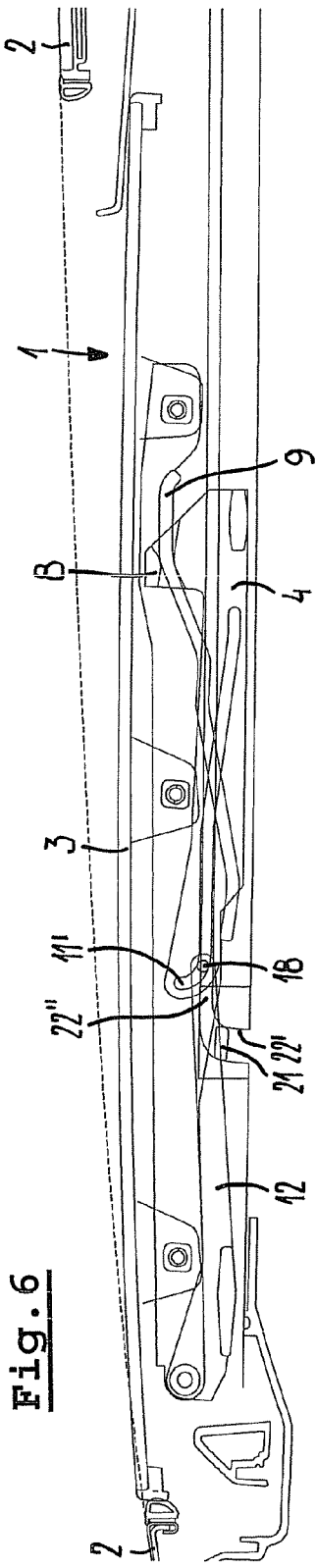
Figure 7:
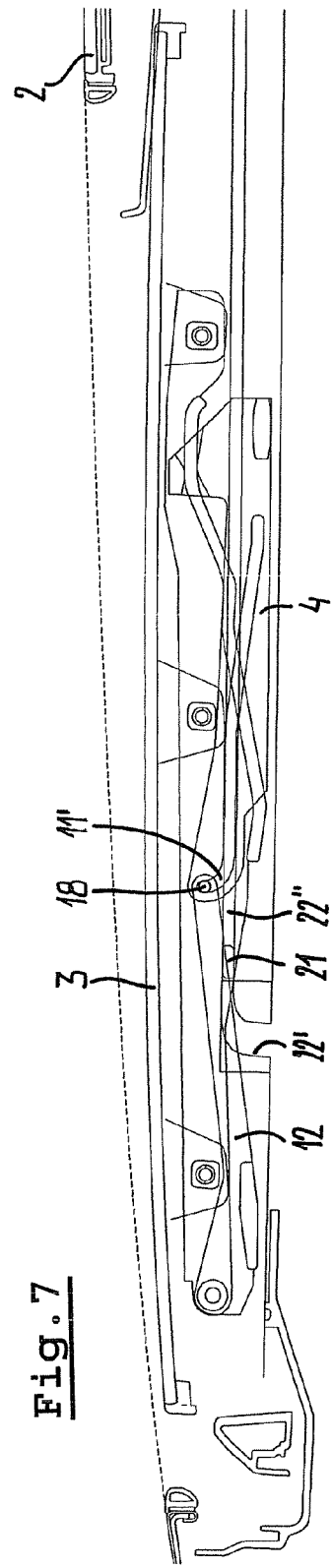
Figure 8:
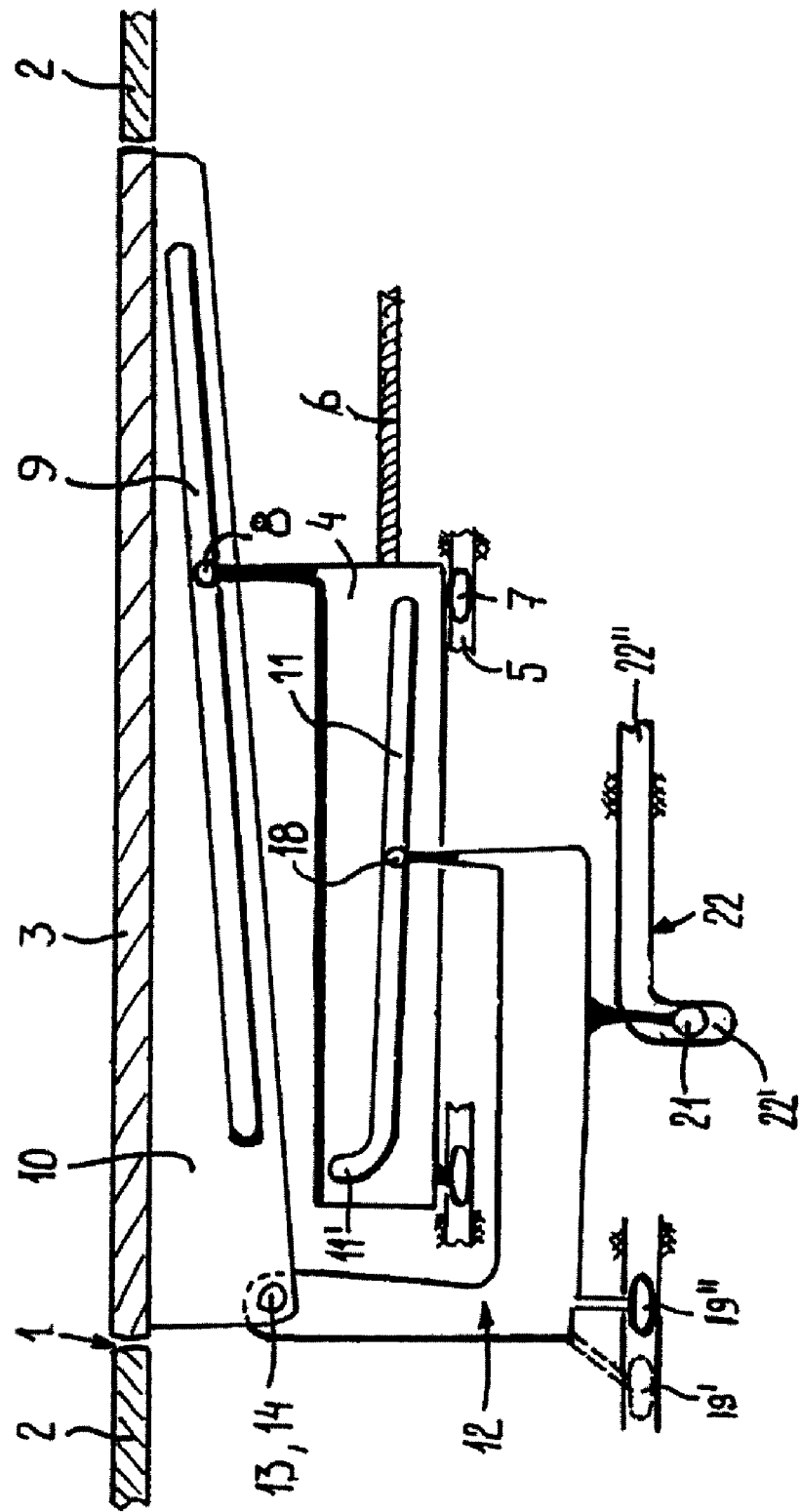
FIGS. 8-10 are schematical side elevational representations of further embodiments of an open roof construction.

Finally, reference is made to FIGS. 4-7 in which an embodiment of the open roof construction or roof assembly is illustrated in four different positions: FIG. 4 shows a closed position (basically in correspondence with FIG. 3); FIG. 5 shows a position in which the panel 3 is rotated upwardly to a tilt position; FIG. 6 shows a position in which the panel 3 is rotated downwardly to a tilt position and FIG. 7 shows a position in which the panel 3, starting from the position illustrated in FIG. 6, is moved to the right.

In FIG. 4 the slide 4 is in a central position and locking member 21 is received in the vertically extending stationary locking guide part 22'. In FIG. 5 slide 4 has been moved to the left thus lifting panel 3 to a tilt position due to the cooperation between the panel engagement device 8 and panel curve 9. The locking member 21 remains in the stationary locking guide part 22', thus maintaining the locking lever 12 and panel 3 in the same longitudinal position. The slide engagement device 18 has moved to the right relative to and in the slide curve 11.

Referring to FIG. 6, the slide 4 now has been moved to the right, starting from the position illustrated in FIG. 4. As a result, the panel 3 is rotated to a downwardly tilt position (again as a result of the cooperation between the panel engagement device 8 of the slide 4 and the panel curve 9). The slide engagement device (e.g. pin) 18 of the locking lever 12 has moved to the left relative to an in the slide curve 11 and has nearly reached the upwardly extending part 11' thereof. The locking lever 12, due to the inclined extension of the slide curve 12, has been moved upwardly slightly with its end carrying the slide engagement device 18, such that the locking member 21 of the locking lever 12 is moved upwardly to a position at the transition between the vertically extending stationary locking guide part 22' and horizontally extending stationary locking guide part 22".

In FIG. 7 the slide 4 has moved still further to the right and the slide engagement device 18 has been moved to its uppermost position in the slide curve part 11'. As a result, the locking member 21 has left the stationary locking guide part 22' and has entered the stationary locking guide part 22". Now the lever 12, together with the panel 3, moves along with the slide 4 to the right.

Although the subject matter has been described in language specific to certain compositions, structural features and/or methodological acts, it is to be understood that the subject matter defined in the appended claims is not necessarily limited to the specific compositions, features or acts described above as has been determined by the courts. Rather, the specific compositions, features and acts described above are disclosed as example forms of implementing the claims. For instance, as appreciated by those skilled in the art, the location of the interconnecting slots and guides herein described (such as cooperating elements 8/9 and 18/11) can be interchanged if desired. In other words, by way of example, element 9 can be formed as a guide slot where element 8 would then be a protrusion configured to cooperate with element 9 as a slot. In addition, it is noted that an additional control of the panel movement can be obtained when the lever guide at least partially is tilted or inclined.

What is claimed is:

1. A roof assembly for an open roof construction of a vehicle having a roof opening defined in a stationary roof part having a stationary slide guide, the roof assembly comprising:
    a movable panel configured for opening and closing said roof opening and having a panel curve;
    a slide which is movable along the stationary slide guide and which is provided with panel engagement device cooperating with the panel curve of the movable panel, wherein a movement of the slide is capable of generating a tilting and/or sliding movement of the panel, and wherein the slide includes a slide curve;
    a locking lever connected to the panel with a hinge and defining a hinge point, wherein the locking lever includes a slide engagement device cooperating with the slide curve of the slide; and
    a guide member cooperating with a stationary lever guide and a locking member cooperating with a stationary locking guide, such that in a first position of the slide the locking member is housed in a first stationary locking guide part preventing a translational movement of the locking lever and the panel connected therewith and in a second position of the slide the locking member is housed in a second stationary locking guide part allowing a translational movement of the locking lever, and thus of the panel connected therewith at the hinge point.

2. The roof assembly according to claim 1, wherein the slide curve has an inclined extension, such that when moving the slide relative to the locking lever the cooperation between the slide curve and the slide engagement device will move the locking member in or out of, respectively, the first stationary locking guide part.

3. The roof assembly according to claim 2, wherein the first stationary locking guide part extends substantially vertically, whereas the second stationary locking guide part extends substantially horizontally.

4. The roof assembly according to claim 2, wherein the first stationary locking guide part extends inclined relative to the vertical.

5. The roof assembly according to claim 1, wherein, as seen in lengthwise direction of the locking lever, the guide member is positioned between the hinge point and the slide engagement device of the locking lever.

6. The roof assembly according to claim 1, wherein, as seen in lengthwise direction of the locking lever, the hinge point is positioned between the guide member and the slide engagement device of the locking lever.

7. The roof assembly according to claim 1, wherein, as seen in lengthwise direction of the locking lever, the hinge point coincides with the guide member of the locking lever.

8. The roof assembly according to claim 1, wherein the locking member coincides with the slide engagement device.

9. The roof assembly according to claim 1, wherein the stationary slide guide and the stationary lever guide coincide.

10. The roof assembly according to claim 1, wherein the locking lever is constructed as a plate-shaped member.

11. The roof assembly according to claim 1, wherein the locking lever is constructed as a member having a U-shaped cross section with two spaced apart webs defining therebetween a gap for at least partially receiving a part of the panel which is provided with the panel curve.

12. The roof assembly according to claim 1, wherein the panel curve is defined by a longitudinal T-shaped member and wherein the panel engagement device of the slide correspondingly define a T-shaped recess for receiving the T-shaped member.

13. The roof assembly according to claim 1, wherein the shape of the slide curve and panel curve is such that during a movement of the slide in a first direction the locking member remains in the first stationary locking guide part and the panel is tilted upwardly to an open position, whereas during a movement of the slide in the opposite direction the locking member is moved out of the first stationary locking guide part and into the second stationary locking guide part and the panel is firstly tilted downwardly to an open position and secondly slid along with the slide in said opposite direction.

14. The roof assembly according to claim 13, wherein said first direction is a forward direction of the vehicle and said opposite direction is a rearward direction of the vehicle.

15. The roof assembly according to claim 2, wherein the second stationary locking guide part extends inclined relative to the horizontal.

16. The roof assembly according to claim 2, wherein the stationary lever guide extends inclined relative to the horizontal.

17. The roof assembly according to claim 2, wherein the first stationary locking guide part extends inclined relative to the vertical and the second stationary locking guide part extends inclined relative to the horizontal and the lever guide extends inclined relative to the horizontal.

18. The roof assembly according to claim 2, wherein the first stationary locking guide part extends inclined relative to the vertical and the second stationary locking guide part extends inclined relative to the horizontal.

19. The roof assembly according to claim 2, wherein the second stationary locking guide part extends inclined relative to the horizontal and the lever guide extends inclined relative to the horizontal.

20. The roof assembly according to claim 2, wherein the first stationary locking guide part extends inclined relative to the vertical and the lever guide extends inclined relative to the horizontal.

* * * * *